United States Patent [19]

Mayweather, III

[11] Patent Number: 4,767,949
[45] Date of Patent: Aug. 30, 1988

[54] MULTIBIT DIGITAL THRESHOLD COMPARATOR

[75] Inventor: William T. Mayweather, III, Stone Mt., Ga.

[73] Assignee: RCA Licensing Corporation, Princeton, N.J.

[21] Appl. No.: 44,611

[22] Filed: May 1, 1987

[51] Int. Cl.$^4$ .................. H03K 5/24; G05B 1/03; G06F 7/02
[52] U.S. Cl. .................. 307/362; 307/494; 328/147; 340/146.2
[58] Field of Search ............... 307/350, 362, 354, 499; 328/147; 340/146.2

[56] References Cited

U.S. PATENT DOCUMENTS

| | | | |
|---|---|---|---|
| 3,755,660 | 8/1973 | Sather | 340/146.2 |
| 3,921,134 | 11/1975 | Myagkov et al. | 340/146.2 |
| 4,155,071 | 5/1979 | Shamburger | 340/146.2 |
| 4,166,271 | 8/1979 | Thirlwall et al. | 340/146.2 |

FOREIGN PATENT DOCUMENTS 0081918  5/1985  Japan .................. 307/362

Primary Examiner—John Zazworsky
Attorney, Agent, or Firm—Eugene M. Whitacre; Paul J. Rasmussen; Eric P. Herrmann

[57] ABSTRACT

A multibit digital threshold comparator is disclosed which comprises a source of a multibit digital input signal representing a signed arithmetic value, and a source of a threshold signal. Means are provided for producing a magnitude representative signal. The magnitude representative signal produced has either the value of the input signal or that of the ones complement of the input signal depending upon the sign of the value of the input signal. A comparator compares the magnitude representative signal to the threshold signal. The comparator performs one of two comparisons depending upon the sign of the value of the input signal. First, if the value of the input signal is of a first sign, then the comparator produces a signal having a first state if the value of the magnitude representative signal is greater than the value of the threshold signal. Second, if the value of the input signal is of a second sign, then the comparator produces a signal having the first state if the value of the magnitude representative signal is greater than or equal to the value of the threshold value. The comparator produces a signal having a second state otherwise.

10 Claims, 3 Drawing Sheets

MULTIBIT DIGITAL THRESHOLD COMPARATOR

The present invention relates to a threshold comparator, having a simplified circuit structure, for a multibit digital signal.

It is often necessary to compare the magnitude of a digital signal to a threshold value in order to control adaptive processing of the digital signal. For example, in an adaptive median filter, a given sample and a plurality of samples surrounding the given sample are processed to determine the median value of those samples. If the magnitude of the difference in value between the median-valued sample and the given sample is greater than a predetermined threshold, then the median-valued sample is substituted for the given sample at the output of the adaptive median filter. Otherwise, the given sample is produced at the output of the adaptive median filter. In this case, it is the magnitude of the difference between the given and the median-valued samples that is compared to the threshold value.

It is desirable to implement a threshold comparator with minimized circuitry. This increases reliability and, if the circuit is to be fabricated on an integrated circuit chip, minimizes the chip area required for the threshold comparison function.

The present invention is directed toward a multibit digital threshold comparator including a source of a multibit digital input signal representing a signed arithmetic value, and a source of a threshold signal. Means are provided for producing a magnitude representative signal. The magnitude representative signal produced has either the value of the input signal or that of the ones complement of the input signal depending upon the sign of the value of the input signal. A comparator compares the magnitude representative signal to the threshold signal. One of two comparisons is performed depending upon the sign of the value of the input signal. First, if the value of the input signal is of a first sign, then the comparator produces a signal having a first state, if the value of the magnitude representative signal is greater than the value of the threshold signal. Second, if the value of the input signal is of the opposite sign, then the comparator produces a signal having the first state if the value of the magnitude representative signal is greater than or equal to the value of the threshold signal. The comparator produces a signal having a second state otherwise.

In FIGS. 1 through 5, thick lines represent multibit digital signal paths and thin lines represent single bit digital signal paths. In addition, for simplicity, matching delays which may be required between elements of the FIGURES, have been omitted. One skilled in the art of digital circuit design will know where such delays are required and how to implement them.

Figure 1:
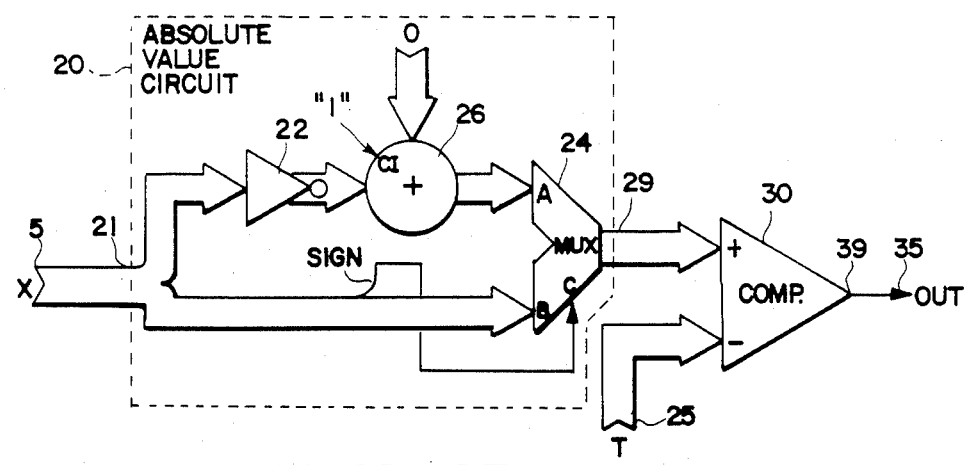
FIG. 1 is a block diagram of a prior art multibit digital threshold comparator.

FIG. 1 illustrates a prior art threshold comparator. In FIG. 1, an input terminal 5 is coupled to receive an input sample X representing, for example, the difference between a given sample and a median-valued sample produced in a median filter as described above. Input terminal 5 is coupled to an input terminal 21 of an absolute value producing circuit 20. An output terminal 29 of the absolute value producing circuit 20 is coupled to a first input terminal (+) of a comparator (COMP) 30. An output terminal 39 of the comparator 30 is coupled to an output terminal 35 which is coupled to utilization circuitry (not shown). For example, output terminal 35 may be coupled to a control input terminal of a multiplexer which produces either the given sample or the median-valued sample at the output of the median filter, in response to the signal at the control input terminal, as in the example described above. An input terminal 25 is coupled to a source (not shown) of a signal having a threshold value T. Input terminal 25 is coupled to a second input terminal (−) of comparator 30.

The input terminal 21 of absolute value producing circuit 20 is coupled to an input terminal of an inverter 22 and a first input terminal (B) of a multiplexer (MUX) 24. Inverter 22 may, for example, consist of a single logic inverter for each bit of the multibit digital signal. An output terminal of inverter 22 is coupled to a first input terminal of an adder 26. An output terminal of adder 26 is coupled to a second input terminal (A) of MUX 24. An output terminal of MUX 24 is coupled to the output terminal 29 of the absolute value producing circuit 20. A signal representing a "0"-valued sample is coupled to a second input terminal of adder 26 and a logic "1" signal is coupled to the carry input terminal of adder 26. The sign-bit of the signal at the input terminal 21 of absolute value producing circuit 20 is coupled to the control input terminal (C) of MUX 24.

The threshold comparator illustrated in FIG. 1 is arranged to process twos-complement multibit digital samples. In twos-complement digital circuitry, the most significant bit of a sample is a sign-bit which is a logic "0" signal if the value of the sample is positive or zero, and a logic "1" signal if the value of the sample is negative. In order to generate the arithmetic negative of a twos-complement sample, each bit of the digital sample must be logically inverted, and a one added to the sample formed by the logically inverted bits.

In the uppermost signal path of the absolute value producing circuit 20 illustrated in FIG. 1, the input sample is coupled first to inverter 22. Inverter 22 generates the logical inverse of each bit of the input sample. Adder 26 adds "1" to this logically inverted sample by presenting a "0"-valued sample at one input terminal, the logically inverted sample at the other input terminal and having a logical "1" signal at the carry input terminal. The output of adder 26 is thus a sample which is the twos-complement, or arithmetic negative, of the sample at the input terminal 21 of the absolute value producing circuit 20.

The sign-bit of the sample at the input terminal 21 of absolute value producing circuit 20 is coupled to the control input terminal of MUX 24. When the signal at control input terminal C is a logic "1" signal (indicating that the value of the input sample is negative) MUX 24 is conditioned to couple input terminal A to its output terminal. Because the sample at input terminal A is the arithmetic negative of the (negative-valued) input sample, the output sample from MUX 24 has the (positive-valued) absolute value of the value of the sample at the input terminal 21. If the signal at control input terminal C of MUX 24 is a logical "0" signal (indicating that the value of the input sample is positive) then MUX 24 is conditioned to couple input terminal B to its output terminal. In this case, absolute value producing circuit 20 produces the signal from its input terminal 21, which is already a positive number, at its output terminal 29.

This absolute-valued sample is compared to the threshold value T in comparator 30. The output of comparator 30, for example, is a "1" when the absolute-valued sample is greater in value than the threshold value, and a "0" otherwise.

Figure 2:
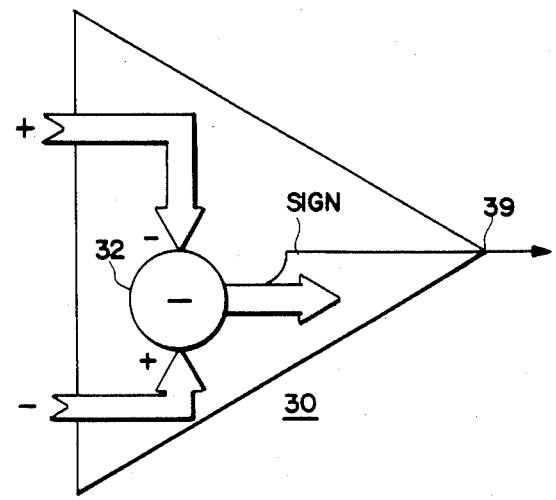
FIG. 2 is a block diagram of a comparator which may be used in the threshold comparator of FIG. 1.

FIG. 2 illustrates a comparator 30 which may be used in the threshold comparator of FIG. 1. In FIG. 2, the first input terminal (+) of comparator 30 is coupled to a subtrahend input terminal (−) of a multibit digital subtractor 32. The second input terminal (−) of comparator 30 is coupled to a minuend input terminal (+) of subtractor 32. The sign-bit (SIGN) of a difference (i.e. minuend-subtrahend) output terminal of subtractor 32 is coupled to the output terminal 39 of comparator 30.

In operation, if the value of the sample at the first input terminal (+) of comparator 30 is greater than that at the second input terminal (−), then the value of the difference is negative. The sign-bit, and, thus, the output signal from comparator 30, is a logic "1" signal. If the value of the sample at the first input terminal (+) of comparator 30 is less than or equal to that at said second input terminal, then the value of the difference is either positive or 0 respectively. In both of these cases, the sign-bit, and, thus, the output signal from comparator 30, is a logic "0" signal.

The absolute value circuit 20 of FIG. 1 requires inverters, a multibit digital adder and a multibit digital multiplexer. These are relatively complicated circuits and would require substantial area, if fabricated on an integrated circuit chip.

Figure 3:
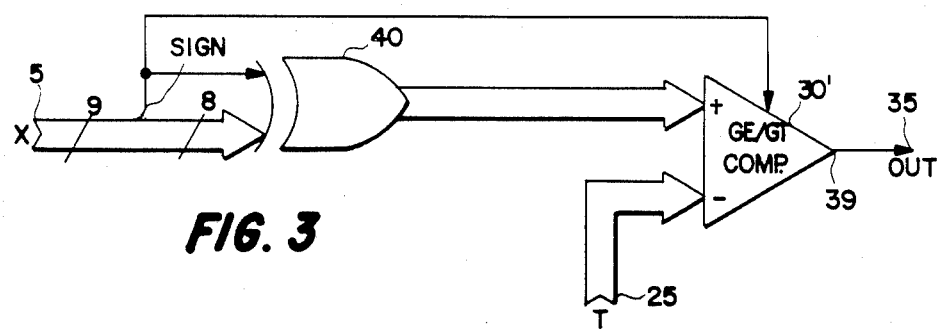
FIG. 3 is a block diagram of a multibit digital threshold comparator in accordance with principles of the present invention.

FIG. 3 illustrates a threshold comparator in accordance with principles of the present invention having reduced circuitry compared to that of FIG. 1. In FIG. 3, elements similar to those in FIG. 1 are designated by the same number and are not discussed in detail. In FIG. 3, the input sample X from input terminal 5 is a 9 bit sample, as indicated by the slash through the multibit digital signal path and the numeral 9 next to it. Input sample X, for example, may be an 8-bit twos complement sample with its sign bit replicated in the most significant ninth bit. The most significant (SIGN) bit from the input terminal 5 is coupled to a first input terminal of an exclusive OR gate 40 and to a control input terminal (GE/$\overline{\text{GT}}$) of a comparator 30'. The remaining 8 bits from the input terminal 5 are coupled to a second input terminal of exclusive OR gate 40. Exclusive OR gate 40 may, for example, include eight 2-input exclusive OR gates, one for each of lesser significance bits of input sample X. A first input terminal of each exclusive OR gate is coupled to receive the sign bit of the input sample X. A second input terminal of each exclusive OR gate is coupled to receive a mutually different one of the remaining 8 bits of the input sample X. The output terminals of the eight exclusive OR gates, in combination, form a multibit digital output terminal of exclusive OR gate 40. The output terminal of exclusive OR gate 40 is coupled to a first input terminal (+) of comparator 30'.

In operation, the sign bit at the input terminal 5 is a logic "0" signal if the input sample value is positive, and a logic "1" signal if the input sample value is negative. If the sign bit is a logical "0" signal (indicating that the value of the input sample X is positive), then exclusive OR gate 40 passes the positive-valued 8 bit input sample at its second input terminal unchanged through to its output terminal.

If the sign bit is a logic "1" signal (indicating that the value of the input sample X is negative), then exclusive OR gate 40 generates a sample which is the bit-by-bit logical inverse of the signal at its second input terminal. The resulting sample represents the magnitude of the negative input signal, and is called the ones complement of the input sample X. (In order to generate twos complement, a "1" must be added to this signal.) Thus, if the sign bit of the input signal is a logic "1" signal, the value of the magnitude representative signal at the output of exclusive OR gate 40 is the absolute value of the input sample X minus one ($|X|-1$).

For example, if the value of the input sample X is 4, then the magnitude representative sample at the output of exclusive OR gate 40 has the value 4, ($|X|$). If, on the other hand, the value of the input sample X is −4, then the magnitude representative sample at the output terminal of exclusive OR gate 40 has the value a 3, ($|X|-1$).

The signal at the control input terminal (GE/$\overline{\text{GT}}$) of comparator 30' conditions the comparator 30' to selectively perform one of two comparisons. When the signal at the control input terminal (GE/$\overline{\text{GT}}$) is a logic "1" signal, indicating that the magnitude representative sample from exclusive OR gate 40 has the value $|X|-1$, the comparator 30' generates, for example, a logic "1" output signal when the value of the magnitude representative sample at its first input terminal (+) is greater than or equal to the threshold value at its second input terminal (−), and a logic "0" output signal otherwise. When the signal at the control input terminal (GE/$\overline{\text{GT}}$) is a logic "0" signal, indicating that the magnitude representative sample from exclusive OR gate 40 has the value $|X|$, comparator 30' generates a logic "1" output signal when the value of the magnitude representative sample at the first input terminal (+) is greater than the threshold value at its second input terminal (−), and a logic "0" signal otherwise.

Referring again to FIG. 3, when the sign bit of the input sample X is a logic "0" signal (X is positive or zero), the value of the magnitude representative signal, from exclusive OR gate 40, is $|X|$. Comparator 30' is conditioned to perform a "greater than" comparison. This comparison may be expressed mathematically:

$$|X| > T \qquad (1)$$

When the sign bit of the input sample X is a logic "1" signal (X is negative), the value of the magnitude representative signal is $|X|-1$. Comparator 30' is conditioned to perform a "greater than or equal to" comparison. This comparison may be expressed mathematically:

$$|X|-1 \geq T \qquad (2)$$

A multibit digital signal, such as input sample X, can only have integer values. In such an integer-only system, if a number is greater than some predetermined threshold, then that number minus one is greater than or equal to that predetermined threshold. Conversely, if a number is not greater than the predetermined threshold, then that number minus one is not greater than or equal to the predetermined threshold.

For example, the number 4 is greater than a threshold value 3, and 4−1 (=3) is greater than or equal to the threshold value 3. The number 3 is not greater than the threshold value 3, and 3−1 (=2) is not greater than or equal to the threshold value 3. The comparisons in equations (1) and (2) are, thus, equivalent comparisons.

In a comparator such as that illustrated in FIG. 2, it is not necessary to include a full subtractor, such as subtractor 32. Instead, only the circuitry necessary to generate a signal indicating the results of the comparison need be included.

Figure 4:
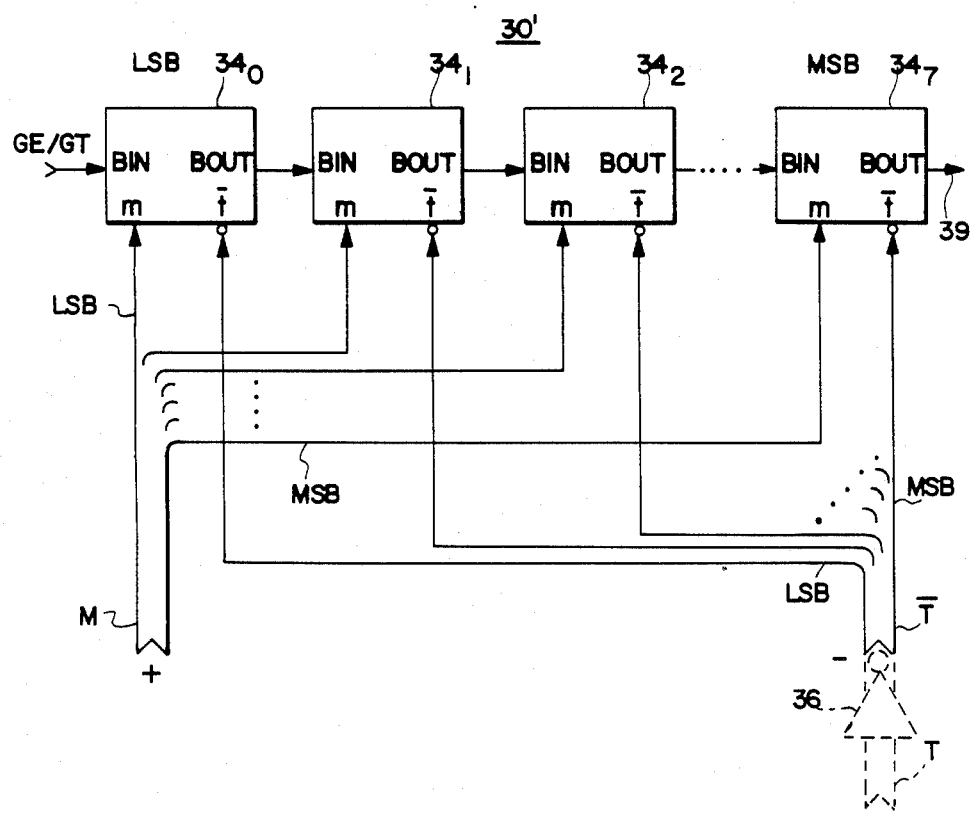
FIG. 4 is a block diagram of a comparator which may be used in the threshold comparator of FIG. 3.

FIG. 4 is a block diagram of a comparator with minimized circuitry. In this embodiment, the threshold-valued input signal ($\overline{T}$) is the bit by bit logical inverse, or ones complement, of the desired threshold value. If a fixed threshold value is used, then: first, the logic value of each bit of the desired threshold must be determined; second, each bit of the threshold value must be logically inverted (generating the signal $\overline{T}$); third, each bit ($\overline{t}$) of the signal ($\overline{T}$) is coupled to a source of a logic "1" or a logic "0" signal, as necessary. If a variable threshold value is used, then a plurality of inverters, one for each bit of the threshold signal, may be coupled between the source of the variable threshold signal and the threshold signal ($\overline{T}$) input terminal (−) of comparator 30', illustrated in phantom in FIG. 4 as an inverter 36.

In FIG. 4, a plurality of comparator bit slices $34_i$ ($0 \leq i \leq 7$) are serially coupled between the control input terminal (GE/$\overline{GT}$) and the output terminal 39. Each bit slice $34_i$ has a borrow input terminal (bin) and a borrow output terminal (bout). The control input terminal (GE/$\overline{GT}$) is coupled to the borrow input terminal (bin) of bit slice $34_0$. The borrow output terminal (bout) of bit slice $34_0$ is coupled to the borrow input terminal (bin) of the bit slice $34_1$. The remaining bit slices are similarly coupled in daisy-chain manner. The borrow output terminal (bout) of the bit slice $34_7$ is coupled to output terminal 39.

Each bit slice $34_i$ also includes first and second bit input terminals m and $\overline{t}$, respectively. The LSB of the magnitude representative signal M, is coupled from the first input terminal (+) of comparator 30', to the m input terminal of bit slice $34_0$; the next lesser significance bit is coupled to the m input terminal of bit slice $34_1$, and so forth. The MSB of the M signal is coupled to the m input terminal of bit slice $34_7$. The LSB of the (inverted) threshold signal $\overline{T}$, from the second input terminal (−) of comparator 30', is coupled to the $\overline{t}$ input terminal of bit slice $34_0$; the next lesser significance bit is coupled to the $\overline{t}$ input terminal of bit slice $34_1$, and so forth. The MSB of the $\overline{T}$ signal is coupled to the input terminal of bit slice $34_7$.

In operation, each bit slice $34_i$ of comparator 30' of FIG. 4 performs the following operation. If the m input signal is a logic "1" signal, and the $\overline{t}$ input signal is a logic "1" signal, representing a t signal of a logic "0" signal (m>t), then a logic "1" borrow output signal (bout) is generated. If the m input signal is a logic "0" signal, and the $\overline{t}$ input signal is a logic "0" signal, representing a t signal of a logic "1" signal (m<t), then a logic "0" borrow output signal (bout) is generated. If the m input signal is a logic "0" signal, and the $\overline{t}$ input signal is a logic "1" signal, representing a t signal of a logic "0" signal, OR the logic m input signal is a logic "1" signal and the $\overline{t}$ input signal is a logic "0" signal, representing a t signal of a logic "1" signal (m=t) then a borrow output signal (bout) having the same value as the borrow input signal (bin) is generated.

The borrow signals are generated in order from the least to the most significant bit positions of the M and $\overline{T}$ signals. If m>t at a bit position and m=t in each more significant bit position, then M>T and a logic "1" signal is generated at output terminal 39. If m<t at a bit position and m=t in each more significant bit position, then M<T and a logic "0" signal is generated at output terminal 39.

If m=t at every bit position, then M=T. The output signal generated at output terminal 39 has the same value as the signal at the control input terminal (GE/$\overline{GT}$). If the signal at the control input terminal (GE/$\overline{GT}$) is a logic "0" signal, then a logic "0" output signal is generated when M=T, and comparator 30' performs a greater than comparison. If the signal at the control input terminal (GE/$\overline{GT}$) is a logic "1" signal, than a logic "1" output signal is generated when M=T, and comparator 30' performs a greater than or equal to comparison.

Figure 5:
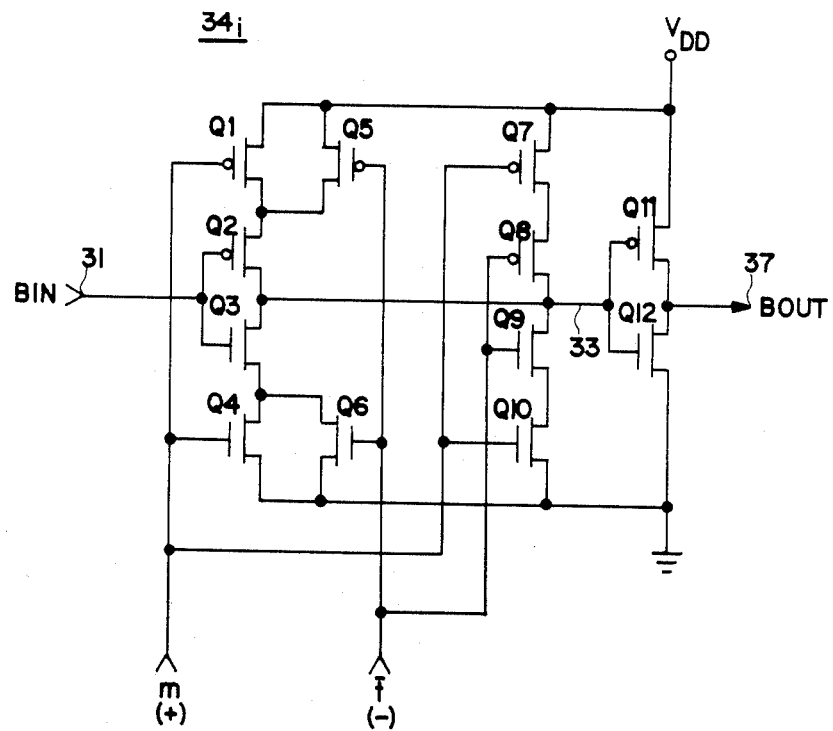
FIG. 5 is a schematic diagram of a comparator bit slice which may be used in the comparator illustrated in FIG. 4.

FIG. 5 is a schematic diagram illustrating one bit slice $34_i$ of a comparator 30' illustrated in FIG. 4. In FIG. 5, P-type MOS transistors are illustrated with small circles on the gate electrodes to indicate that the source drain path of the transistor is conditioned to become conductive in response to a logic "0" signal (ground potential) at its gate electrode. N-type MOS transistors are illustrated without small circles on the gate electrodes to indicate that the source drain path of the transistor is conditioned to become conductive in response to a logic "1" signal (supply potential) at its gate electrode.

In FIG. 5, source drain paths of P-type MOS transistors Q1 and Q2 and N-type MOS transistors Q3 and Q4 are serially coupled in order between a source of supply potential ($V_{DD}$) and a source of reference potential (ground). A source drain path of a further P-type MOS transistor Q5 is coupled in parallel with the source drain path of MOS transistor Q1, and a source drain path of a further N type MOS transistor Q6 is coupled in parallel with the source drain path of MOS transistor Q4. Source drain paths of P type MOS transistors Q7 and Q8 and N type MOS transistors Q9 and Q10 are serially coupled in order between the source of supply potential ($V_{DD}$) and the source of reference potential (ground). Source drain paths of a P type MOS transistor Q11 and an N type MOS transistor Q12 are serially coupled between the source of supply potential ($V_{DD}$) and the source of reference potential (ground).

A first input terminal 31 receives a borrow input signal (bin). Input terminal 31 is coupled to respective gate electrodes of MOS transistors Q2 and Q3. A second input terminal (m) receives a predetermined bit of the magnitude representative signal (M) from the first input terminal (+) of comparator 30', as illustrated in FIG. 4. Input terminal (m) is coupled to respective gate electrodes of MOS transistors Q1, Q4, Q7 and Q10. A third input terminal ($\overline{t}$) receives a predetermined bit of the threshold signal ($\overline{T}$) from the second input terminal (−) of comparator 30', as illustrated in FIG. 4. Input terminal ($\overline{t}$) is coupled to respective gate electrodes of MOS transistors Q5, Q6, Q8 and Q9. The predetermined bits of the signals at the input terminals m and $\overline{t}$ are the same significance bits of their respective multibit signals.

The junction of the source drain paths of MOS transistors Q2 and Q3 is coupled to the junction of the source drain paths of MOS transistors Q8 and Q9 and to respective gate electrodes of MOS transistors Q11 and Q12 through a signal path 33. The junction of the source drain paths of MOS transistors Q11 and Q12 are coupled to an output terminal 37 of the bit slice of comparator 30' and produces the borrow output signal (bout).

In operation, each bit slice $34_i$ of comparator 30', illustrated in FIG. 5, performs the operation described above in reference to FIG. 4. In FIG. 5, MOS transistors Q2 and Q3 form an inverter processing the borrow input signal (bin) from the binary input terminal 31. MOS transistors Q1, Q4, Q5 and Q6 enable or disable the inverter formed by MOS transistors Q2 and Q3. MOS transistors Q1 and Q5 provide supply potential to the inverter. At least one of the input bits m or $\bar{t}$ must be a logic "0" signal for supply potential to be provided to the inverter. If both bits are logic "1" signals, then the inverter does not receive supply potential and signal path 33 is isolated from the input terminal 31. MOS transistors Q4 and Q6 provide reference potential to the inverter. At least one of the input bits m or $\bar{t}$ must be a logic "1" signal for reference potential to be provided to the inverter. If both bits are logic "0" signals, then the inverter does not receive reference potential and signal path 33 is isolated from the input terminal 31. Thus if m and $\bar{t}$ are equal, signal path 33 is isolated from input terminal 31, and if they are different, signal path 33 carries a signal which is the logical inverse of the borrow input signal (bin) at borrow input terminal 31.

As described above, if m and $\bar{t}$ are equal, then signal path 33 is isolated from the borrow input terminal 31. If both m and $\bar{t}$ are logic "0" signals, then MOS transistors Q7 and Q8 are both conditioned to be conductive and MOS transistors Q9 and Q10 are both conditioned to be nonconductive. Signal path 33 is coupled to the supply potential source $V_{DD}$ and thus, produces a logic "1" signal. If both m and $\bar{t}$ are logic "1" signals, then MOS transistors Q7 and Q8 are both conditioned to be nonconductive and MOS transistors Q9 and Q10 are conditioned to be conductive. Signal path 33 is coupled to the reference potential source (ground) and, thus produces a logic "0" signal.

MOS transistors Q11 and Q12, in combination, form an inverter. Signal path 33 supplies a signal to the input terminal of the inverter and the output terminal supplies a borrow output signal (bout) to output terminal 35 of the comparator bit slice.

In summary, three situations are possible. First, if m and $\bar{t}$ are both logic "0" signals, (that is, m is a logic "0" signal and t is a logic "1" signal, i.e. m<t), then the binary output signal (bout) is a logic "0" signal. Second, if m and $\bar{t}$ are both logic "1" signals (that is, m is a logic "1" signal and t is a logic "0" signal, i.e. m>t), then the binary output signal (bout) is a logic "1" signal. Third, if m is not equal to $\bar{t}$ (that is, m is equal to t, i.e. m=t), then the binary output signal (bout) is equal to the binary input signal (bin).

What is claimed is:

1. A multibit digital threshold comparator, comprising:
    a source of a multibit digital input signal representing a signed arithmetic value;
    a source of a threshold signal;
    means for producing a magnitude representative signal selectively having the value of said input signal or the value of the ones complement of said input signal in response to the sign of the arithmetic value of said input signal; and
    comparator means for generating an output signal having a first state when:
    (a) the value of said input signal is of a first sign and the value of said magnitude representative signal is greater than the value of said threshold signal, or
    (b) the value of said input signal is of a second sign and the value of said magnitude representative signal is greater than or equal to the value of said threshold signal,
    and having a second state otherwise.

2. The threshold comparator of claim 1, wherein:
    said input signal is represented in twos complement form and includes a sign bit indicating the sign of the value of said input signal; and
    said magnitude representative signal producer comprises a plurality of exclusive OR gates having respective first input terminals all responsive to said sign bit, respective second input terminals responsive to mutually different bits of said input signal, and respective output terminals which, in combination, produce said magnitude representative signal.

3. The threshold comparator of claim 1, wherein said comparator means comprises a subtractor having a minuend input terminal coupled to said threshold signal source, a subtrahend input terminal coupled to said magnitude representative signal producer, and an output terminal producing said output signal from said comparator means.

4. The threshold comparator of claim 1, wherein said comparator means comprises:
    a plurality of comparator bit slices, each having a borrow input terminal, a borrow output terminal, and first and second bit input terminals, each for generating a signal at said borrow output terminal having a first state when the signal at said first bit input terminal is greater than that at said second bit input terminal, having a second state when the signal at said first bit input terminal is less than that at said second bit input terminal, and having the state of the signal at said borrow input terminal when the signal at said first bit input terminal is equal to that at said second bit input terminal.

5. The threshold comparator of claim 4, wherein:
    a first one of said plurality of bit slices has said borrow input terminal coupled to a control input terminal of said comparator means;
    a last one of said plurality of bit slices has said borrow output terminal producing said output signal of said comparator means; and
    said remaining ones of said plurality of bit slices have said respective borrow input and borrow output terminals coupled in daisy chain manner between said borrow output terminal of said first one of said plurality of bit slices and said borrow input terminal of said last one of said plurality of bit slices.

6. The threshold comparator of claim 5, wherein:
    respective first bit input terminals of said plurality of bit slices are responsive to mutually different bits of said magnitude representative signal; and
    respective second bit input terminals of said plurality of bit slices are responsive to mutually different bits of said threshold signal.

7. The threshold comparator of claim 4, wherein at least one of said comparator bit slices comprises:

a controlled switch coupled between said borrow input terminal and said borrow output terminal for selectively coupling said borrow input terminal to said borrow output terminal in response to equality of signals at said first and second bit input terminals, and isolating said borrow input terminal from said borrow output terminal otherwise;

first means for coupling said borrow output terminal to a source of a signal having said first state in response to the signal at said first bit input terminal being greater than that at said second bit input terminal; and second means for coupling said borrow output terminal to a source of a signal having said second state in response to the signal at said first bit input terminal being less than that at said second bit input terminal.

8. The threshold comparator of claim 7, wherein said controlled switch comprises:

a first and second MOS transistor of a first conductivity type, and a third and fourth MOS transistor of a second conductivity type having respective source drain paths serially coupled between said source of a signal having said first state and said source of a signal having said second state, and having respective gate electrodes;

a fifth MOS transistor of said first conductivity type having a source drain path coupled in parallel with said source drain path of said first MOS transistor, and having a gate electrode;

a sixth MOS transistor of said second conductivity type having a source drain path coupled in parallel with said source drain path of said fourth MOS transistor, and having a gate electrode;

first means for coupling said first bit input terminal to said gate electrodes of said first and fourth MOS transistors;

second means for coupling said second bit input terminal to said gate electrodes of said fifth and sixth MOS transistors;

third means for coupling said borrow input terminal to said gate electrodes of said second and third MOS transistors; and fourth means for coupling the junction of said source drain paths of said second and third MOS transistor to said carry output terminal.

9. The threshold comparator of claim 8, wherein said first coupling means comprises:

seventh and eighth MOS transistors of said first conductivity type having respective source drain paths coupled between said source of a signal having said first state and said borrow output terminal, and having respective gate electrodes;

means for coupling said first bit input terminal to said gate electrode of said seventh MOS transistor; and means for coupling said second bit input terminal to said gate electrode of said eighth MOS transistor.

10. The threshold comparator of claim 9, wherein said second coupling means comprises:

ninth and tenth MOS transistors of said second conductivity type having respective source drain paths coupled between said source of a signal having said second state and said borrow output terminal, and having respective gate electrodes;

means for coupling said first bit input terminal to said gate electrode of said tenth MOS transistor; and means for coupling said second bit input terminal to said gate electrode of said ninth MOS transistor.

* * * * *